United States Patent

[11] 3,574,890

| [72] | Inventor | Walter Gresch<br>Lachmattser. 55, Muttenz, Switzerland |
|---|---|---|
| [21] | Appl. No. | 656,714 |
| [22] | Filed | July 28, 1967 |
| [45] | Patented | Apr. 13, 1971 |

[54] COMBINED HEATING AND MIXING APPARATUS
2 Claims, 2 Drawing Figs.

| [52] | U.S. Cl. | 18/12 |
|---|---|---|
| [51] | Int. Cl. | B29f 3/06 |
| [50] | Field of Search | 18/12 (SE), 12 (SH), 14 (V) |

[56] References Cited

UNITED STATES PATENTS

| RE23,240 | 6/1950 | Magerkurth et al. | 18/12 |
|---|---|---|---|
| 830,201 | 9/1906 | Blondel | 18/14VUX |
| 2,453,088 | 11/1940 | Dulmage | 18/12 |
| 2,752,633 | 7/1956 | Weitzel | 18/12 |
| 2,780,834 | 2/1957 | Bernhardt | 18/12 |
| 3,035,303 | 5/1962 | Stanley | 18/12 |
| 3,177,527 | 4/1965 | Nelson | 18/12 |
| 3,183,553 | 5/1965 | Slater | 18/12 |
| 3,205,534 | 9/1965 | Langecker | 18/14 |
| 3,281,896 | 11/1966 | Meyer et al. | 18/14 |

*Primary Examiner*—Charles W. Lanham
*Assistant Examiner*—R. Spencer Annear
*Attorney*—Michael S. Striker ABSTRACT: Apparatus for carrying out high-temperature processes during extrusion and comprising an elongated housing having an inlet and an outlet and screw means in the housing and having a first kneading and mixing screw portion adjacent the inlet and a coaxial second portion adjacent the outlet and having a larger pitch and a smaller screw depth than the first portion. The apparatus includes further heating means surrounding the housing at least in the region of the second screw portion and adjustable throttling means in the region of the outlet.

Patented April 13, 1971
3,574,890
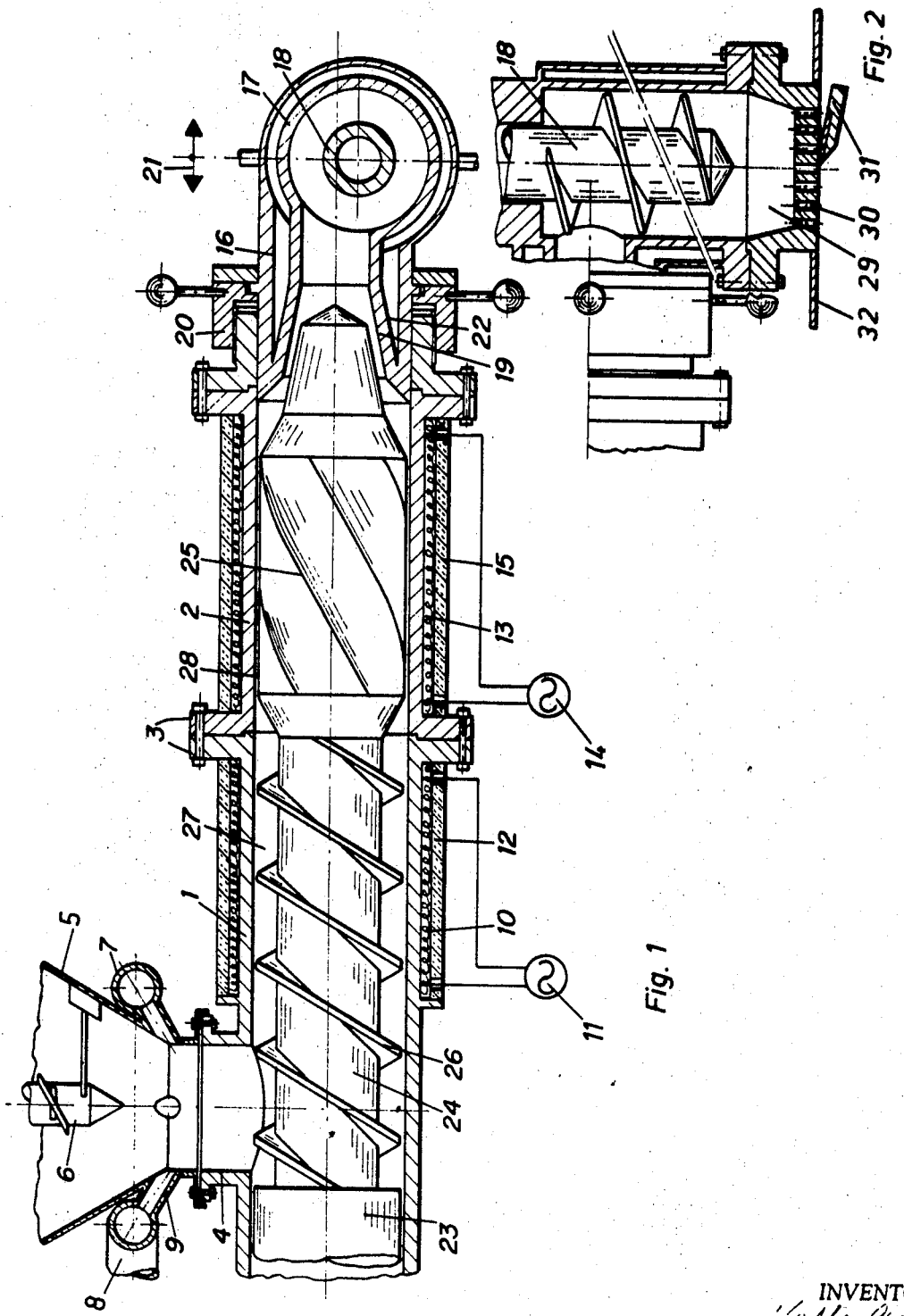

COMBINED HEATING AND MIXING APPARATUS

The present invention concerns an apparatus for carrying out high temperature processes in one or more worm machines. The invention is suitable for carrying out processes, e.g., reaction processes which anticipate a relatively high temperature, e.g., above 300° C. Plastic substances may with advantage be worked, the viscosity of which decreases relatively sharply with increasing temperature, as well as powdery materials which change into a plastic condition under the effect of pressure and heat.

According to the invention the starting product is first heated predominantly by mechanical internal friction so that it passes through a viscous paste state to change into a less viscous material, to which heat is then supplied chiefly by direct heat transmission from outside.

The apparatus for carrying out the aforementioned steps by means of a worm machine has according to the invention, a two-part working member arranged in a housing, which working member comprises a kneading part having a normal thread depth and a subsequent thin-layer element having a thin working layer, at least the housing of the thin-layer element being provided with heating. It may be of advantage that the thin-layer element comprise a worm having little thread depth or a cylinder with a small clearance from the housing, which worm is formed as a friction element to provide additional friction energy.

An embodiment of the subject of the invention is shown in the accompanying drawings, in which:

FIG. 1 is a vertical axial cross section taken through the apparatus; and

FIG. 2 is a horizontal cross section through the discharge worm.

The apparatus for carrying out high-temperature processes has a housing which comprises a housing section 1 and a housing section 2, which housing sections are arranged on the same axis one behind the other, and are connected by flanges 3. The housing section 1 is provided with a filling hole 4 which is provided with a funnel tube to feed in the product to be treated. In the funnel tube 5 there is provided a stirrer 6 and beneath the stirrer a ring conduit 7 round the outside of the funnel tube, which ring conduit has a delivery pipe 8 and conduits 9 which open into the interior of the funnel tube. In addition the cylindrical housing section 1 is provided with an induction heater 10 having current supply 11, which induction heater encloses the housing section on the outside. To prevent loss of heat to the outside, there is arranged a heat insulation 12.

The housing section 2 is of similar form to the housing section 1, but has a stronger induction heater 13 having a current supply 14 and heat insulation 15. The closure of the housing section 2 is formed by a discharge member 16 which is in communication with the housing 17 of a discharge screw 18. The discharge member 16 has an axially displacable but nonrotatable hollow cone 19 which may be displaced in the directions indicated by the arrows 21 by means of an adjusting device 20 which is in the form of a connection nut. The cooling jacket of the discharge member is indicated by 22.

In the housing section 1 is housed a shaft 23 which is driven through a drive (not shown); in order to provide a good kneading effect, a reciprocating motion may also be superimposed on the rotary motion of the shaft. In this case there is a worm provided with gaps, which worm cooperates with kneading teeth arranged on the housing. The extension of the shaft 23 forms a worm 24 which extends from the filling opening 4 to the flange 3 and then becomes a friction element 25. The worm 24 has worm threads 26 of normal pitch and normal thread depth 27, while the friction element 25 has a large pitch with respect to the screw, only a very thin working layer 28 remaining between the friction element and the housing section 2.

The product to be treated passes through the funnel tube 5 by means of the stirrer 6 into the working chamber of the housing section 1, at the same time a protective gas, e.g., nitrogen, being supplied through the delivery pipes 9. The air is driven out by the protective gas so that at the high temperatures occurring, it cannot influence the product chemically. In the housing section 1, the heat required to obtain the required temperature is predominantly supplied to the product by the mechanical internal frictional work. The induction heater 10 only serves to initiate the heating process, in particular to initiate plastification with powdery starting substances. After the viscosity of the material has fallen to such an extent that no more frictional heat worth mentioning may be produced, the remaining heat is supplied predominantly by the induction heater which, compared to ohmic heating of the housing, heats both the housing and the thin-layer element. This heating can take place over a relatively small heat transmission surface; the material in the housing section 2 is in a relatively thin layer. The material then passes into the cooled housing 17, is conveyed by the discharge worm 18 and finally fed to a discharge nozzle 29 with a granulating perforated plate 30. Finally, the product is granulated by means of the rotating cutting device 31 in a collecting housing 32.

It is also possible to allocate the steps of the method in the housing section 1 and the housing section 2 separately, by means of two separate machines arranged one behind the other.

The apparatus is also particularly suitable for decomposing high-molecular compounds, e.g., polyolefin. In this case decomposition to a lower average molecular weight is desired, wherein with respect to direct polymerization a narrower molecular weight distribution is to be obtained. This decomposition is effected by the provision of a mechanical and thermic loading of the material at relatively high temperature. In the housing section 2, the material is raised to a high temperature and at the same time mechanically loaded. Discharge out of the housing section 2 may be more or less throttled by means of the adjusting device 20. In this way the degree of filling or the duration and thus the degree of decomposition may be influenced. After decomposition, the material is sharply cooled in the cooled housing 17 so that it may be granulated with the usual means.

I claim:

1. Apparatus for carrying out high-temperature processes, especially for the decomposition of high molecular compounds at temperatures of over 300° C., comprising elongated housing means having an axis, an inlet in the region of one end thereof and an outlet in the region of the opposite end; elongated screw means arranged in said housing rotatable about said axis, said elongated screw means comprising a first screw means portion having a first end in the region of said inlet and an opposite end between said inlet and said outlet end serving to knead and mix material fed through said inlet in said housing means to thereby heat the material due to the friction produced during said kneading and mixing and to transport the material in the direction toward said outlet, and a second screw means portion having a greater pitch but a smaller thread depth than said first portion; heating means surrounding at least said second screw means portion for applying heat to the thin layer of material surrounding said second screw means portion; adjustable throttling means in the region of said outlet; and discharge means connected to said outlet and comprising a tubular member extending transverse to said axis, a rotatable feed screw coaxially arranged within said tubular member and a cooling jacket surrounding said tubular member.

2. An apparatus as defined in claim 1, wherein said second screw means portion has in the region of said outlet a nonthreaded substantially frustoconical portion, and wherein said tubular member is connected and communicates with said outlet of said housing means through a tubular connecting member arranged in said housing means slidable in the direction of the axis thereof and having an inner frustoconical surface portion surrounding said frustoconical portion of said second screw means portion so that the open cross section at said outlet may be adjusted by said tubular connecting member in direction of said axis, and means cooperating with said tubular connecting member for shifting the same in said direction and for maintaining the same in any adjusted position.